United States Patent Office 2,764,615
Patented Sept. 25, 1956

2,764,615
ALKOXYALKYLAMINES AND ACID ADDITION SALTS

John B. Data, West Lafayette, Ind., and Blaine M. Sutton, Philadelphia, Pa., assignors to Purdue Research Foundation, West Lafayette, Ind., a corporation of Indiana No Drawing. Application May 1, 1952, Serial No. 285,552

6 Claims. (Cl. 260—584)

The present invention relates to a new series of alkoxyalkylamines and to processes for their manufacture. More particularly, the invention relates to alkoxyalkylamines wherein the amino group is on the beta position and the alkoxy group is on the omega carbon atom and acid addition salts thereof.

The new compounds in the form of the free bases can be represented by the following formula:

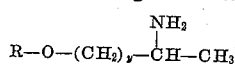

in which R is an alkyl group having from 1 to 5 carbon atoms and y represents a number from 1 to 3, inclusive.

These new compounds possess useful pharmacological properties and are also useful as intermediates for the preparation of other new compounds. They are especially useful as vasoconstrictors.

According to the present invention, the new compounds represented by the general formula above can be prepared by methods illustrated by the following reactions:

METHOD A

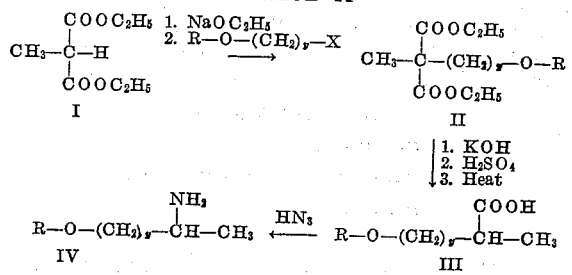

METHOD B

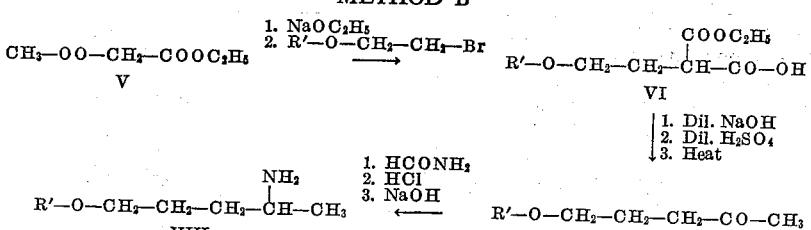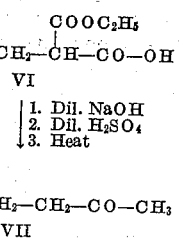

In the above schemes, R is $CH_3$—, $C_2H_5$—, $C_3H_7$—, $C_4H_9$—, iso-$C_4H_9$—, or $C_5H_{11}$; R' is $C_2H_5$— or $C_3H_7$—; y is 1 to 3, inclusive; and X is Cl or Br.

Most of the compounds were prepared by Method A. The appropriate monocarboxylic acids needed for Method A were prepared by the malonic ester synthesis (Prelog, V., and Heimbach, S., Ber., 72, 1101 (1939) and Simonsen, J. L., J. Chem. Soc., 93, 1777 (1908)). Diethyl methylmalonate (I) was prepared from methyl bromide and diethyl malonate. The diethyl substituted malonates (II) were prepared from (I) and an alkoxyalkyl bromide or chloride. The disubstituted esters were hydrolyzed and subsequently decarboxylated in the usual way to give the alkoxyalkanoic acids, (III). The monocarboxylic acids were allowed to react with hydrazoic acid, generated in situ from sodium azide and sulfuric acid, to yield the desired amines (IV). The bases were obtained by steam distillation of the basified reaction mixtures. Nine amines were prepared by this procedure. These are 2-amino-1-methoxypropane, 2-amino-1-ethoxypropane, 2-amino-1-propoxypropane, 2-amino-1-(2-methylpropoxy)-propane, 2-amino-1-butoxypropane, 2-amino-1-pentoxypropane, 2-amino-4-methoxybutane, 2-amino-4-ethoxybutane and 2-amino-4-propoxybutane. The bases were converted into sulfate salts for characterization and as suitable salts for the preparation of solutions to be used in pharmacological studies.

The alkoxy derivatives of 2-aminopentane were prepared by the reaction as illustrated by Method B. The appropriate alkoxyalkanones needed for the reaction were prepared by the acetoacetic ester synthesis. (Marvel, C. S., and Hager, F. D., in Gilman, H., and Blatt, A. H., "Organic Syntheses," Ed. 2, John Wiley and Sons, New York, 1941, Coll. vol. I, page 248). Ethyl acetoacetate (V) and an alkoxyalkyl bromide were condensed in the presence of sodium ethoxide to give ethyl substituted acetoacetates (VI). The esters were converted to the ketones (VII). The ketones were refluxed with formamide, and the complexes which resulted were decomposed with hydrochloric acid to yield the salts of the desired amines. The free bases were isolated by steam distillation or extraction of the basified reaction mixtures. Two bases were prepared by this reaction. These are 2-amino-5-ethoxypentane and 2-amino-5-propoxypentane. These amines were converted into sulfate salts.

Preparation of intermediates for Method A

*Diethylmethylmalonate.*—A 2-liter, 3-necked flask was equipped with a mercury-sealed stirrer, a reflux condenser and a gas inlet tube which reached nearly to the bottom of the flask. Absolute ethyl alcohol, 1000 ml., was added to the flask followed by 46.0 gm. (2.0 gram atoms) of metallic sodium. To the solution there was added 320.0 gm. (2.0 moles) of redistilled diethyl malonate. Methyl bromide was introduced into the hot solution while stirring the reaction mixture. The time required for the addition was seven hours. The mixture was allowed to stand overnight, and the sodium bromide was then filtered off. The slightly basic filtrate was neutralized with glacial acetic acid and most of the alcohol removed by distillation. The residue was cooled and poured into 600 ml. of distilled water which contained 10 ml. of hydrochloric acid (36%) and the sodium bromide that had been filtered off previously. The mixture was shaken and the upper organic layer separated off. The water layer was extracted with three 25 ml. portions of ether and the ether extracts combined with the organic layer. The combined ethereal solution was dried quickly by shaking for approximately one minute with anhydrous calcium chloride. The mixture was filtered rapidly, and the solvent removed by distillation. In order to remove unreacted diethyl malonate, the residue was shaken for one minute with a cooled solution of 10.0 gm. of sodium hydroxide in 30 ml. of distilled water. This step saponifies the unreacted diethyl malonate without appreciably affecting the substituted ester. The aqueous layer was removed immediately, and the organic layer was washed with three 25 ml. portions of hydrochloric acid (10%) and then distilled water. The ester was dried quickly again by shaking for one minute with anhydrous calcium chloride, filtered and the organic material fractionated to give 286.0 gm. (82.3%) of diethyl methylmalonate, B. P. 85–90° C. at 14 mm. pressure; reported (Weiner, N., in Blatt, A. H., "Organic Syntheses," John Wiley and Sons, New York, 1943, Coll. vol. II, p. 279), B. P. 96° C. at 16 mm. pressure.

*Diethyl methoxymethylmethylmalonate.* — Powdered sodium, 11.5 gm. (0.5 gram atom), was placed in a 1-liter, 3-necked flask which contained 500 ml. of anhydrous ether. The flask was equipped with a stirrer, dropping funnel and a reflux condenser. While stirring the mixture, 87.0 gm. (0.5 mole) of diethyl methylmalonate was added at such a rate that the ether refluxed gently. A semisolid mass resulted when all of the sodium had reacted. The mixture was cooled with an ice bath. To the rapidly stirred mixture, there was added slowly 50.0 gm. (0.62 mole) of methoxymethyl chloride. During the addition the semisolid mass dissolved slowly and precipitation of sodium chloride resulted. When the addition of the methoxymethyl chloride was completed, the mixture was allowed to come to room temperature and stand overnight. The precipitated sodium chloride was removed by shaking the mixture with 100 ml. of distilled water which contained 5 ml. of hydrochloric acid (36%). The ether layer was collected and dried over anhydrous sodium sulfate. The ethereal solution was concentrated and the residue fractionated to yield 92.0 gm. (84.0%) of diethyl methoxymethylmethylmalonate, B. P. 81–90° C. at 2 mm. pressure; reported (Wagner, R. B., J. Am. Chem. Soc., 71, 3214 (1949)), B. P. 115–117° C. at 16 mm. pressure.

In an analogous manner, the following diethyl alkoxymethylmethylmalonates were obtained:

Diethyl ethoxymethylmethylmalonate, B. P. 101–115° at 4 mm. pressure.
Diethyl propoxymethylmethylmalonate, B. P. 104–110° at 3 mm. pressure.
Diethyl butoxymethylmethylmalonate, B. P. 108–111° at 2 mm. pressure.
Diethyl isobutoxymethylmethylmalonate, B. P. 112–118° at 4 mm. pressure.
Diethyl pentoxymethylmethylmalonate, B. P. 119–128° at 3 mm. pressure.

*Diethyl beta-methoxyethylmethylmalonate.* — A solution of sodium ethoxide was prepared by dissolving 13.6 gm. (0.59 gram atom) of metallic sodium in 290 ml. of absolute ethyl alcohol. To the solution there was added 103.0 gm. (0.59 mole) of diethyl methylmalonate followed by 90.0 gm. (0.59 mole) of beta-methoxyethyl bromide. The bromide was added at such a rate that the heat of reaction caused the alcohol to reflux gently. After the addition was complete, the solution was stirred and refluxed for six hours until the reaction mixture was neutral to litmus. The precipitate of sodium bromide was removed by filtration and the filtrate was concentrated. The residue was cooled and then poured into 150 ml. of distilled water containing 5 ml. of hydrochloric acid (36%) and the sodium bromide which had been separated previously. The mixture was shaken and the upper organic layer removed. The water layer was extracted with three 25 ml. portions of ether and the extracts combined with the ester layer. The ethereal solution was dried by first shaking quickly with anhydrous calcium chloride and then allowing the filtered solution to set over Drierite. The ethereal solution was concentrated and the residue fractionated to give 84.0 gm. (61.0%) of diethyl beta-methoxyethylmethylmalonate, B. P. 104–106° C. at 6 mm. pressure.

In an analogous manner, the following diethyl alkoxyethylmethylmalonates were obtained:

Diethyl beta-ethoxyethylmethylmalonate, B. P. 118–120° at 7 mm. pressure.
Diethyl beta-propoxyethylmethylmalonate, B. P. 130–133° at 6 mm. pressure.
Diethyl beta-isopropoxyethylmethylmalonate, B. P. 118–121° at 5 mm. pressure.
Diethyl beta-isobutoxyethylmethylmalonate, B. P. 131–134° at 5 mm. pressure.

Preparation of alkoxyalkanoic acids

The alkoxyalkanoic acids required as intermediates were prepared from the hydrolysis of diethyl alkoxyalkylmethylmalonate with alcoholic potassium hydroxide and subsequent decarboxylation of the crude substituted malonic acid.

*3-methoxy-2-methylpropanoic acid.* — A solution of 78.0 gm. (0.34 mole) of diethyl methoxymethylmethylmalonate, 280 ml. of aqueous potassium hydroxide (50%), and 50 ml. of ethyl alcohol was refluxed for two hours. Most of the alcohol was removed by distillation and the reaction mixture was cooled. Sufficient sulfuric acid (50%) was added to make the solution strongly acid. The sodium sulfate which precipitated was filtered off and the filtrate concentrated to one-half of its original volume. The residue was extracted with four 25 ml. portions of ether, and the combined ether extracts were dried over anhydrous sodium sulfate. The ether solution was filtered and the solvent removed by distillation. The residue was heated to 130–140° until the evolution of carbon dioxide ceased (six hours). The residue was fractionated under reduced pressure using a nitrogen bleed for the attainment of smooth boiling to give 15.0 gm. (50%) of 3-methoxy-2-methylpropanoic acid, B. P. 104–109° at 14 mm. pressure; reported (Wagner, R. B., J. Am. Chem. Soc., 71, 3217 (1949)), B. P. 83° at 3 mm. pressure.

The alkoxyalkanoic acids listed in the following table were prepared according to a procedure similar to that described for 3-methoxy-2-methylpropanoic acid:

ALKOXYALKANOIC ACIDS

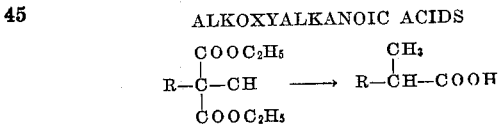

| R | B. P., ° C. (mm. pressure) |
|---|---|
| Ethoxymethyl | 110–111 (13 mm.) |
| Propoxymethyl | 123–124 (12 mm.) |
| Butoxymethyl | 117–119 (5 mm.) |
| Isobutoxymethyl | 120–121 (7 mm.) |
| Pentoxymethyl | 122–124 (4 mm.) |
| beta-Methoxyethyl | 120–121 (13 mm.) |
| beta-Ethoxyethyl | 123–126 (10 mm.) |
| beta-Propoxyethyl | 133–134 (8 mm.) |
| beta-Isopropxyethyl | 125–126 (7 mm.) |
| beta-Isobutoxyethyl | 129.5–130.5 (5 mm.) |

Example 1.—2-amino-1-methoxypropane

A mixture of 15.0 gm. (0.127 mole) of 3-methoxy-2-methylpropanoic acid, 43.6 gm. (0.445 mole) of sulfuric acid (96%) and 150 ml. of anhydrous chloroform was placed in a 300-ml., 3-necked flask equipped with a stirrer, thermometer and reflux condenser. The mixture was heated with a Glascol heating mantle to 41° C., and the mantle was then removed. To the rapidly stirred solution there was added 9.9 gm. (0.152 mole) of sodium azide at such a rate that the temperature of the reaction mixture did not exceed 43° C. After all of the sodium azide had been added, the mixture was heated to 50–55° C. for six hours at which time evolution of gas had practically ceased. The mixture was allowed to cool and the chloroform layer decanted from the flask. The residual acidic material was chilled in an ice bath and the mixture made basic to litmus by the slow addition of sodium hydroxide solution (50%). The solution was then steam distilled until the distillate was neutral to litmus. The distillate was made slightly acidic with sulfuric acid (50%), and the acid solution was concentrated to about 10 ml. Solid sodium hydroxide was added to the cooled, concentrated solution. The amine layer which separated was removed by several ether extractions. The ethereal extracts were dried over solid potassium hydroxide, filtered and the filtrate fractionated to yield 4.0 gm. (35.4%) of 2-amino-1-methoxypropane, B. P. 92.5–93.5° C. at 743 mm. pressure.

The amine was converted into the sulfate salt by the slow addition of an ethereal solution of sulfuric acid to a stirred ethereal solution of the base. The addition should be done cautiously so as not to add an excess of sulfuric acid. If excessive sulfuric acid is added, the amine sulfate oils and the product is difficult to solidify. The salt was recrystallized from isopropyl alcohol, M. P. 265–266° C. (decom.). Anal. calcd. for $C_8H_{24}N_2O_6S$: N, 9.68. Found: N, 9.70.

*Example II.—2-amino-1-ethoxypropane*

This compound was prepared by the same procedure as described for Example I but using the appropriate alkoxyalkanoic acid. The boiling point of the free base is 111–115° C. The melting point of the sulfate is 262–263.5° C. (decom.). Anal. calcd. for $C_{10}H_{28}N_2O_6S$: N, 9.21. Found: N, 9.25.

*Example III.—2-amino-1-propoxypropane*

This compound was prepared by the same procedure as described for Example I but using the appropriate alkoxyalkanoic acid. The boiling point is 135–137° C. at 745 mm. pressure. The melting point of the sulfate is 265–266° C. (decom.). Anal. calcd. for $C_{12}H_{32}N_2O_6S$: N, 8.43. Found: N, 8.29.

*Example IV.—2-amino-1-butoxypropane*

This compound was prepared by the same procedure as described for Example I but using the appropriate alkoxyalkanoic acid. The boiling point is 153–154° C. at 740 mm. pressure. The melting point of the sulfate is 288.5–290° C. (decom.). Anal. calcd. $C_{14}H_{36}N_2O_6S$: N, 7.77. Found: N, 7.82.

*Example V.—2-amino-1-(2-methylpropoxy)-propane*

This compound was prepared by the same procedure as described for Example I but using the appropriate alkoxyalkanoic acid. The boiling point is 144–145° C. at 748 mm. pressure. The melting point of the sulfate is 285–286° C. (decom.). Anal. calcd. $C_{14}H_{36}N_2O_6S$: N, 7.77. Found: N, 7.45.

*Example VI.—2-amino-1-pentoxypropane*

This compound was prepared by the same procedure as described for Example I but using the appropriate alkoxyalkanoic acid. The boiling point is 177–178° C. at 748 mm. pressure. The melting point of the sulfate is 295–296° C. (decom.). Anal. calcd. $C_{16}H_{49}N_2O_6S$: N, 7.22. Found: N, 7.11.

*Example VII.—2-amino-4-methoxybutane*

This compound was prepared by the same procedure as described for Example I but using the appropriate alkoxyalkanoic acid. The boiling point is 123–126° C. at 740 mm. pressure. The melting point of the sulfate is 278–279° C. (decom.). Anal. calcd. $C_{10}H_{28}N_2O_6S$: N, 9.21. Found: N, 9.22.

*Example VIII.—2-amino-4-ethoxybutane*

This compound was prepared by the same procedure as described for Example I but using the appropriate alkoxyalkanoic acid. The boiling point is 137–140° C. at 748 mm. pressure. The melting point of the sulfate is 286–287° C. (decom.). Anal. calcd. $C_{12}H_{32}N_2O_6S$: N, 8.43. Found: N, 8.36.

*Example IX.—2-amino-4-propoxybutane*

This compound was prepared by the same procedure as described for Example I but using the appropriate alkoxyalkanoic acid. The boiling point of the free base is 157–158° C. at 750 mm. pressure. The melting point of the sulfate is 287–288° C. (decom.). Anal. calcd. $C_{14}H_{36}N_2O_6S$: N, 7.77. Found: N, 7.85.

*Preparation of alkoxyalkanones as intermediates for Method B*

The alkoxyalkanones prepared as intermediates were synthesized by means of the acetoacetic ester synthesis wherein alkoxyalkyl halides were condensed with ethyl acetoacetate in the presence of sodium ethoxide and the resultant product converted to the desired ketone.

*5-ethoxy-2-pentanone.*—To a solution of 26.0 gm. (1.13 gram atoms) of sodium dissolved in 565 ml. of absolute ethyl alcohol, there was added 147.0 gm. (1.13 moles) of ethyl acetoacetate. The stirred solution was heated to boiling, and then 192.0 gm. (1.25 moles) of beta-ethoxyethyl bromide was added slowly during a period of three hours. The reaction mixture was refluxed for nine hours, and the solution was then allowed to stand overnight. The reaction mixture was filtered and the alcohol distilled from the filtrate. The residue was fractionated to give 88.0 gm. (38.5%) of ethyl beta-ethoxyethylacetoacetate.

A mixture of 88.0 gm. (0.435 mole) of the ester and 500 ml. of aqueous sodium hydroxide (5%) was stirred for three hours at room temperature. A small amount of unsaponifiable material was separated off. The aqueous solution was acidified with sulfuric acid (50%) until markedly acidic. Evolution of gas occurred. The reaction mixture was distilled until the distillate equalled about one-half of the original volume. The distillate was saturated with potassium carbonate which caused an organic layer to separate. The mixture was extracted with three 25 ml. portions of ether, and the combined ethereal extracts were dried with Drierite and then filtered. The solvent was removed by distillation and the residue fractionated to give 37.0 gm. (66.0%) of product, B. P. 164–167° C. at 750 mm. pressure.

A portion of the ketone was condensed with semicarbazide in the usual way and the resultant product recrystallized from water to give a pure semicarbazone melting at 84–85° C.

*5-propoxy-2-pentanone.*—To a solution of 7.6 gm. (0.33 gram atoms) of sodium dissolved in 165 ml. of absolute ethyl alcohol, there was added 43.4 gm. (0.33 mole) of ethyl acetoacetate. The stirred solution was heated to boiling, and then 61.0 gm. (0.37 mole) of beta-propoxyethyl bromide was added slowly. The reaction mixture was then refluxed for ten hours, cooled, filtered and the alcohol removed by distillation. The residue was cooled, 330 ml. of sodium hydroxide solution (5%) was added and the mixture was stirred for four hours. A small unsaponifiable layer was separated off, and the remainder of the solution was acidified with sulfuric acid (50%). The acid solution was distilled until the distillate equaled about one-half of the volume of the original solution. The distillate was saturated with potassium carbonate and the water insoluble layer collected. The water layer was extracted with several portions of ether. The ether extracts and organic material were combined, the ethereal solution dried with anhydrous sodium sulfate, and the mixture filtered. The solvent was removed by distillation, and the residue fractionated to give 13.0 gm. (27.0%) of product, B. P. 78–80° C. at 15 mm. pressure.

The semicarbazone when recrystallized several times from water melted at 75.5–76° C.

*Example X.—2-amino-5-propoxypentane*

A mixture of 13.0 gm. (0.09 mole) of 5-propoxy-2-pentanone, 16.2 gm. (0.36 mole) of formamide and 12 ml. of formic acid (80%) was heated together at 170–180° C. for eight hours. The mixture was cooled and poured into 30 ml. of water. The water solution was saturated with potassium carbonate. The upper layer was separated off and then refluxed for one hour with 10 ml. of hydrochloric acid (36%). The amine was liberated by the addition of solid potassium hydroxide to the acidic solution, and the liberated oil was extracted with ether. The combined ethereal extracts were dried over solid potassium hydroxide, filtered, and the residue fractionated to give 6.0 gm. (48.6%) of 2-amino-5-propoxypentane, B. P. 81–82° at 17 mm. pressure.

The base was converted to the sulfate salt and recrystallized from isopropyl alcohol. The pure product melted at 294–295° C. (decom.). Anal. calcd. $C_{16}H_{40}N_2O_6S$: N, 7.22. Found: N, 7.22.

*Example XI.—2-amino-5-ethoxypentane*

This compound was prepared by the same procedure as described for Example X but using the appropriate alkoxyalkanone. The boiling point of the free base is 164.5–166° C. at 748 mm. pressure. The melting point of the sulfate is 284.5–286° C. (decom.). Anal. calcd. $C_{14}H_{36}N_2O_6S$: N, 7.77. Found: N, 7.79.

The free bases are converted to acid addition salts, and instead of the sulfate described in the examples, acid addition salts of inorganic and organic acids can be prepared. By treatment of the base with an equivalent amount of acid such as for example, hydrochloric, nitric, carbonic, phosphoric, acetic, propionic, tartaric, and citric acid, the corresponding addition salt will be obtained.

We claim:

1. A compound of the class consisting of a free base and its acid addition salts, said free base having the following formula:

$$R-O-(CH_2)_y-\underset{\underset{NH_2}{|}}{C}H-CH_3$$

wherein R represents an alkyl group having from 1 to 5 carbon atoms and $y$ represents a whole number of from 1 to 3.

2. The compound 2-amino-1-(2-methylpropoxy)propane.
3. The compound 2-amino-1-butoxypropane.
4. The compound 2-amino-4-propoxybutane.
5. The compound 2-amino-5-ethoxypentane.
6. The compound 2-amino-4-ethoxybutane.

References Cited in the file of this patent

UNITED STATES PATENTS

| | | |
|---|---|---|
| 2,372,624 | Carpenter | Mar. 27, 1945 |
| 2,457,656 | Givins et al. | Dec. 28, 1948 |

OTHER REFERENCES

Beilstein's Handbuch der Organischen Chemie, vol. 4, 1st suppl., 1929, p. 438.